US008957880B2

(12) United States Patent
Tanaka et al.

(10) Patent No.: US 8,957,880 B2
(45) Date of Patent: Feb. 17, 2015

(54) IMAGE DISPLAY APPARATUS HAVING BACK LIGHT WITH MULTIPLE LIGHT SOURCES AND CONFIGURED TO CONTROL LUMINANCE FOR EACH OF A PLURALITY OF AREAS THAT EXCEED THE NUMBER OF LIGHT SOURCES

(75) Inventors: Kazuhiko Tanaka, Fujisawa (JP); Yasutaka Tsuru, Yokohama (JP); Yuya Ogi, Chigasaki (JP)

(73) Assignee: Hitachi Maxell, Ltd., Osaka (JP)

( * ) Notice: Subject to any disclaimer, the term of this patent is extended or adjusted under 35 U.S.C. 154(b) by 958 days.

(21) Appl. No.: 12/491,334

(22) Filed: Jun. 25, 2009

(65) Prior Publication Data

US 2010/0045694 A1 Feb. 25, 2010

(30) Foreign Application Priority Data

Aug. 25, 2008 (JP) ................................ 2008-214805

(51) Int. Cl.
*G06F 3/038* (2013.01)
*G09G 5/00* (2006.01)
*G09G 3/36* (2006.01)
*F21V 7/04* (2006.01)
*G09G 3/34* (2006.01)

(52) U.S. Cl.
CPC .................. *G09G 3/342* (2013.01); *G09G 3/36* (2013.01); *G09G 2320/0233* (2013.01); *G09G 2320/062* (2013.01)
USPC ........... 345/204; 345/102; 345/690; 362/600; 362/602; 362/615; 362/617; 362/623

(58) Field of Classification Search
USPC ..................... 345/102; 349/65; 362/600–634
See application file for complete search history.

(56) References Cited

U.S. PATENT DOCUMENTS

| | | | | |
|---|---|---|---|---|
| 6,947,169 | B2 * | 9/2005 | Nitta | 358/1.2 |
| 2004/0114396 | A1 | 6/2004 | Kobayashi et al. | |
| 2004/0124764 | A1 * | 7/2004 | Suzuki et al. | 313/498 |
| 2007/0115303 | A1 * | 5/2007 | Aoki et al. | 345/690 |
| 2007/0296886 | A1 | 12/2007 | Inada et al. | |
| 2008/0030650 | A1 * | 2/2008 | Kitagawa et al. | 349/65 |
| 2008/0043170 | A1 * | 2/2008 | Ikeda | 349/65 |
| 2010/0020005 | A1 * | 1/2010 | Jung et al. | 345/102 |

FOREIGN PATENT DOCUMENTS

| | | |
|---|---|---|
| CN | 1499262 | 5/2004 |
| CN | 101097054 | 1/2008 |
| JP | 2008-009415 | 1/2008 |

OTHER PUBLICATIONS

Hanfeng Chen et al., "Locally Pixel-compensated backlight dimming on LED-backlight LCD TV", Journal of the SID 2007 pp. 981-988.

* cited by examiner

*Primary Examiner* — Ryan A Lubit
(74) *Attorney, Agent, or Firm* — Antonelli, Terry, Stout & Kraus, LLP.

(57) ABSTRACT

In a local dimming technology for reducing power consumption of a display device using a backlight as in a liquid crystal display, the backlight is configured by a plurality of independently controllable light sources, an image is divided into areas of the same number as that of the controllable light sources and light emission intensity of the light source is calculated based on a feature value of each area. However, this technology has a problem that when a backlight luminance distribution within each area is not uniform, image quality is deteriorated or a power consumption reduction effect is lowered.

In the present invention, the image is divided into areas of the number greater than that of the controllable light sources, and the light emission intensity of each light source is determined based on the feature values of a plurality of areas to reduce the above-described problem.

4 Claims, 10 Drawing Sheets

| AREA | HORIZONTAL COORDINATE RANGE | VERTICAL COORDINATE RANGE | NEAREST LIGHT SOURCE |
|---|---|---|---|
| AREA (0,0) | 0≦x<960 | 0≦y<270 | LIGHT SOURCE 100 |
| AREA (0,1) | 0≦x<960 | 270≦y<540 | LIGHT SOURCE 101 |
| AREA (0,2) | 0≦x<960 | 540≦y<810 | LIGHT SOURCE 102 |
| AREA (0,3) | 0≦x<960 | 810≦y<1080 | LIGHT SOURCE 103 |
| AREA (1,0) | 960≦x<1920 | 0≦y<270 | LIGHT SOURCE 110 |
| AREA (1,1) | 960≦x<1920 | 270≦y<540 | LIGHT SOURCE 111 |
| AREA (1,2) | 960≦x<1920 | 540≦y<810 | LIGHT SOURCE 112 |
| AREA (1,3) | 960≦x<1920 | 810≦y<1080 | LIGHT SOURCE 113 |

FIG.5

$$V0(x,y) = \left(\frac{P0(x,y)}{255}\right)^{\gamma} \times BL0(x,y)$$ —— EXPRESSION 1

$$V1(x,y) = \left(\frac{P1(x,y)}{255}\right)^{\gamma} \times BL1(x,y)$$ —— EXPRESSION 2

$$\left(\frac{P0(x,y)}{255}\right)^{\gamma} \times BL0(x,y) = \left(\frac{P1(x,y)}{255}\right)^{\gamma} \times BL1(x,y)$$ —— EXPRESSION 3

$$\left(\frac{Pmax}{255}\right)^{\gamma} \times BL0(x,y) = \left(\frac{255}{255}\right)^{\gamma} \times BL1(x,y)$$ —— EXPRESSION 4

$$\alpha = \frac{BL1(x,y)}{BL0(x,y)} = \left(\frac{Pmax}{255}\right)^{\gamma}$$ —— EXPRESSION 5

$$P1(x,y) = \left(\frac{BL0(x,y)}{BL1(x,y)}\right)^{\frac{1}{\gamma}} \times P0(x,y)$$ —— EXPRESSION 6

$$\alpha = \left(\frac{Pmax}{255}\right)^{\gamma} \quad \text{— EXPRESSION 7}$$

$$P1(x,y) = \left(\frac{BLT(x,y)}{BL1(x,y)}\right)^{\frac{1}{\gamma}} \times P0(x,y)$$ —— EXPRESSION 8

$$\alpha = \left(\frac{Pmax}{255}\right)^{\gamma} \leqq \frac{BL1(x,y)}{BLT(x,y)}$$ —— EXPRESSION 9

IMAGE DISPLAY APPARATUS HAVING BACK LIGHT WITH MULTIPLE LIGHT SOURCES AND CONFIGURED TO CONTROL LUMINANCE FOR EACH OF A PLURALITY OF AREAS THAT EXCEED THE NUMBER OF LIGHT SOURCES

INCORPORATION BY REFERENCE

The present application claims priority from Japanese application JP2008-214805 filed on Aug. 25, 2008, the content of which is hereby incorporated by reference into this application.

BACKGROUND OF THE INVENTION

The present invention relates to an image display apparatus that displays input image data.

In a display device that uses backlight without emitting light by itself as in liquid crystals, power consumption of the backlight occupies most of that of the display device in many cases. In this case, reduction in the power consumption of the backlight has the key to that of the entire display device.

For the purpose, a processing where the light quantity of the backlight is reduced in a dark video scene is performed, and thereby, attempts are made to reduce the power consumption of the display device. When the light quantity of the backlight is simply reduced to 1/N, the brightness of the screen is also decreased to 1/N if nothing is done. However, the light quantity of the backlight is reduced to 1/N, and further, a pixel value of each pixel is corrected to thereby increase transmissivity of each liquid crystal pixel to N times. By doing so, the brightness of the screen can be finally maintained.

However, the transmissivity of each liquid crystal pixel cannot be set to a value greater than a maximum transmissivity that is feasible in liquid crystal elements. Therefore, an upper limit exists in a value of N. For the purpose of maximizing N in a range where the degradation in the image quality is prevented from occurring, the value of N may be adjusted such that the transmissivity of a liquid crystal pixel corresponding to a brightest pixel in a display image is set to the maximum transmissivity of the liquid crystal element. As described above, a method of collectively controlling backlight luminance of the entire screen as described above is referred to as global dimming.

In the global dimming, even if one luminescent spot is present in the screen, the value of N is affected by the luminescent spot and the luminance of the entire backlight increases. Therefore, an effect of the reduction in the power consumption is hard to be exerted too much depending on contents of the video in some cases.

To cope with the above-described problem, recently, watched is a technology called local dimming in which a screen is divided into small areas, a light source corresponding to each small area is prepared on one-on-one level, the light emission intensity of each light source can be independently controlled, and thereby, the luminance of the backlight is controlled to each area ("Locally Pixel-compensated backlight dimming on LED-backlight LCD TV", Hanfeng Chen et al., Journal of the SID 2007 pp 981-988). Based on a pixel value in the area using the same manner as in the global dimming technology, the light emission intensity of a light source corresponding to each area is determined in this technology. This operation is performed over all the areas within the screen, thereby determining the light emission intensities of all the light sources. Using these values, each light source is controlled, and at the same time, each pixel value of input images is compensated in the same manner as in the global dimming technology. Thereby, the power consumption can be reduced without almost deteriorating quality of the video.

It is desired that when the global dimming technology is performed, light emitted from each light source is uniformly irradiated on the corresponding area, and further, light emitted from the other light sources has no effect on a luminance distribution within the area. However, light emitted from each light source actually extends also over other areas in many cases. In this case, when light emitted from the light source corresponding to the area is irradiated on the area and light emitted from light sources near the area is not irradiated on the area, the original luminance of the backlight in the area cannot be attained in some cases. Also under the above-described conditions, as a method of assuring the necessary backlight luminance, in JP-A-2008-9415, provided is a method of emitting light from ambient light sources with a value obtained by multiplying the light emission intensity by a certain constant value at the time of emitting light from a certain light source.

SUMMARY OF THE INVENTION

In JP-A-2008-9415, disclosed is a method where a pixel value of a pixel with maximum luminance within an area corresponding to each light source on one-on-one level is found to determine an initial value of light emission intensity of the light source using the pixel value. The above-described method is effective when light emitted from the light source corresponding to each area is uniformly spread; however, the method has the possibility that the power consumption reduction amount is lowered or the image quality is deteriorated when light is not uniformly spread.

In the present invention, when calculating the light emission intensity of each light source, not only a pixel value of a pixel with the maximum luminance within the area but also position information thereof is used at the same time to solve the above-described problem. Specifically, used is a method of dividing the entire display screen into areas whose number is greater than that of systems of the independently controllable light sources, finding out a feature value of a maximum of the pixel within each area, and calculating the light emission intensity of each light source using the feature values.

For example, according to one aspect of the present invention, there is provided an image display apparatus. The image display apparatus comprises: a liquid crystal panel having a plurality of pixels arranged in a matrix;

the liquid crystal panel including a first image area on the first end side, a second image area on the second end side, and a third image area between the first and second image areas;

a plurality of light sources arranged on the back side of the liquid crystal panel;

the plurality of light sources including at least a first light source arranged on a first end side in a horizontal direction of the liquid crystal panel and a second light source arranged on a second end side different from the first end; and a controller controlling light emission intensity of the light source;

the controller controlling the light emission intensity of the first light source and that of the second light source, thereby displaying an image in the third image area.

Further, for example, according to another aspect of the present invention, there is provided an image display apparatus. The image display apparatus comprises: a liquid crystal panel having a plurality of pixels arranged in a matrix;

the liquid crystal panel including a plurality of image areas, wherein the number of the plurality of image areas is greater than that of the plurality of light sources; and a plurality of light sources arranged on the back side of the liquid crystal panel;

the light source being formed from a plurality of small light sources controlled by one control signal.

According to the present invention, the amount of power consumption or the deterioration in the image quality can be suppressed.

BRIEF DESCRIPTION OF THE DRAWINGS

These and other features, objects and advantages of the present invention will become more apparent from the following description when taken in conjunction with the accompanying drawings wherein:

FIG. 5 is a view illustrating calculating expressions at the time of performing local dimming;

DESCRIPTION OF THE EMBODIMENTS

Figure 1:
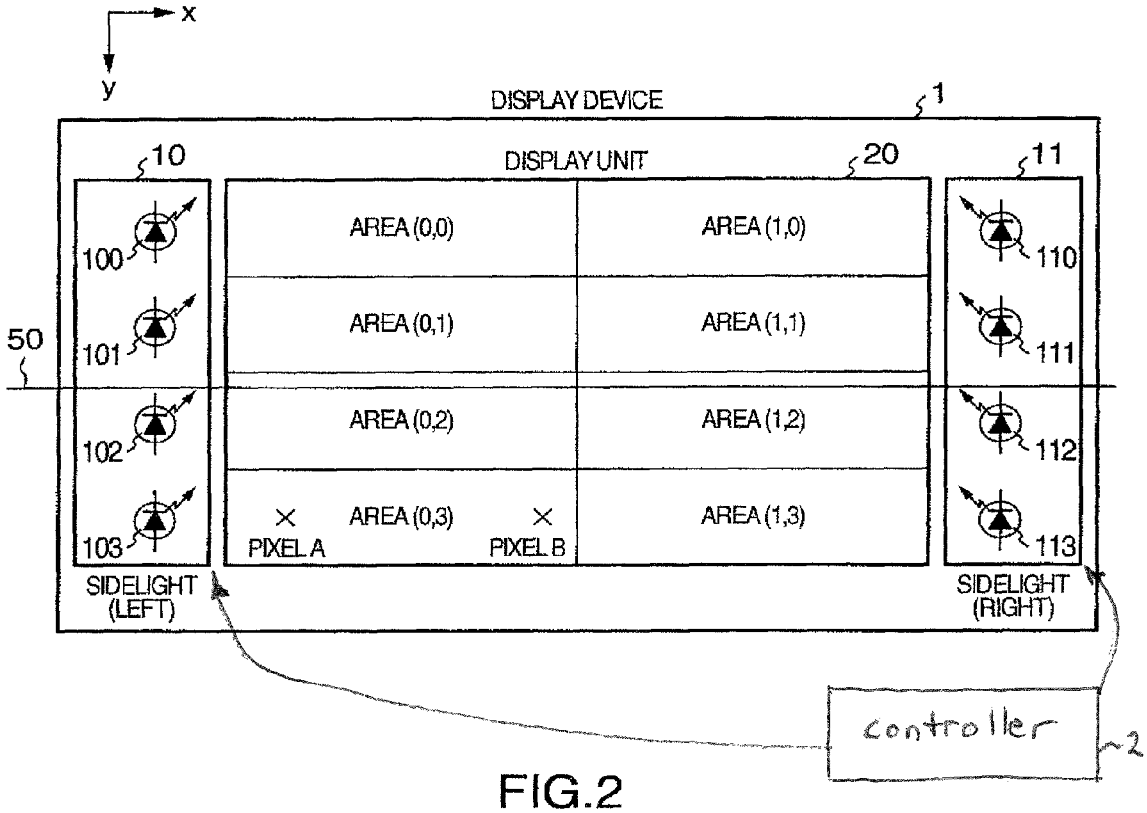
FIG. 1 is a front view illustrating a relationship between a display unit and a sidelight.

Hereinafter, preferred embodiments of the present invention will be described in detail with reference to the accompanying drawings of the embodiments.

In reference numerals indicated in the drawings of the embodiments, a reference numeral 2 denotes a controller,a reference numeral 10 denotes a left-hand sidelight, 11 denotes a right-hand sidelight, 20 denotes a display unit, 21 denotes a liquid crystal panel, 22 denotes a diffusing plate, 23 denotes a light guide plate, 24 denotes a reflecting sheet, 30 denotes a backlight luminance distribution at the time of lighting only the left-hand sidelight, 31 denotes a backlight luminance distribution at the time of lighting only the right-hand sidelight, 32 denotes a backlight luminance distribution at the time of lighting both of the sidelights, 33 denotes a target backlight luminance distribution at the time of correcting an image, 100 denotes a top controllable light source of the left-hand sidelight, 101 denotes a second controllable light source from the top of the left-hand sidelight, 102 denotes a third controllable light source from the top of the left-hand sidelight, 103 denotes a bottom controllable light source of the left-hand sidelight, 110 denotes a top controllable light source of the right-hand sidelight, 111 denotes a second controllable light source from the top of the right-hand sidelight, 112 denotes a third controllable light source from the top of the right-hand sidelight, and 113 denotes a bottom controllable light source of the right-hand sidelight.

(Embodiment 1)

Figure 2:
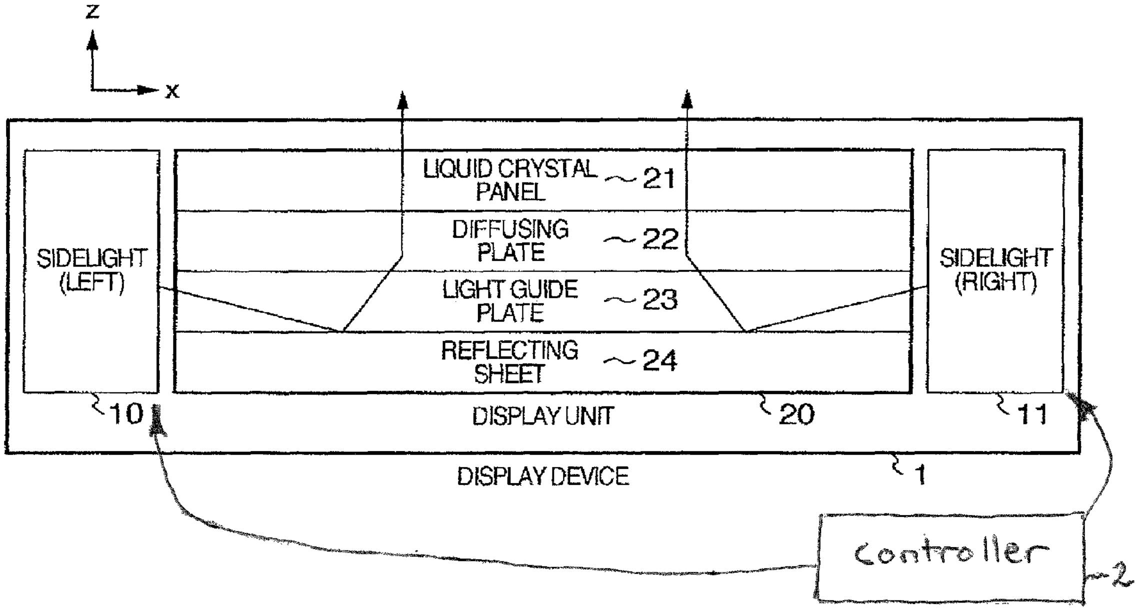
FIG. 2 is a cross-sectional view illustrating a relationship between a display unit and a sidelight.

FIG. 1 is a front view illustrating a display device 1 according to an embodiment 1 of the present invention, and FIG. 2 is a cross-sectional view obtained by cutting FIG. 1 with one plane 50 vertical to the Y-axis direction. In addition, in FIG. 1, the X direction is defined as the horizontal direction of the figure, the Y direction is defined as the direction vertical to the figure, and the Z direction is defined as the direction perpendicular to both of the X direction and the Y direction. The display device 1 includes the display unit 20 that displays a video, and the right and left sidelights 10 and 11 that are used as light sources of the display unit 20. The left-hand sidelight 10 has four light sources 100, 101, 102, and 103 capable of having independently controlled light emission intensity (by controller 2), and meanwhile, the right-hand sidelight 11 has four light sources 110, 111, 112, and 113 capable of having independently controlled light emission intensity (by controller 2). In the present example, it is assumed that each of the light sources 100 to 103 and the light sources 110 to 113 is constituted of a single or a plurality of light-emitting diodes. When each light source modulates the pulse width (PWM modulation) of an input current, the light emission intensity can be freely varied between 0 to 100% of a maximum.

On the other hand, the display unit 20 has a structure in which the liquid crystal panel 21, the diffusing plate 22, the light guide plate 23, and the reflecting sheet 24 are superposed in the form of layers. This structure is one example, and there may also be used a structure in which another sheet is interleaved between respective layers, an order of layers is interchanged, or an unnecessary layer is removed. A layer that is used in a general liquid crystal device can be used as each layer, and therefore, a detailed description is here omitted and operations will be only introduced simply.

Light emitted from the sidelights 10 and 11 is spread over the entire face of the display unit 20 via the light guide plate 23. Specifically, the light is reflected by the reflecting sheet 24, and thereby, it is radiated on the liquid crystal panel 21 side, that is, on the side of a person that is viewing the screen. In the present specification, a remaining portion in which the sidelights 10 and 11, and the liquid crystal panel 21 of the display unit 20 are removed from the display device 1 is referred to as a backlight for the reason of a light source behind the liquid crystal panel 21. The diffusing plate 22 has a function of appropriately diffusing light reflected by the reflecting sheet 24 to uniform luminance of the backlight.

On the liquid crystal panel 21, the liquid crystal switches of the number that is equivalent to that of pixels corresponding to the panel resolution are two-dimensionally disposed. In the case of a color liquid crystal, disposed are the liquid crystal switches of the number obtained by multiplying the number of pixels by the number of color components constituting each pixel. As this liquid crystal switch, there is widely used a switch formed by sandwiching a substance called the liquid crystal between two sheets of transparent electrodes. Further, a voltage applied between the transparent electrodes is adjusted, thereby changing the amount of light that transmits through the liquid crystal switch. Light emitted from the backlight is visible to human eyes through the liquid crystal switches. In the case where the transmissivity of the liquid crystal switch is low, most of light emitted from the backlight is shielded, and therefore, the liquid crystal switch looks dark. On the contrary, in the case where the transmissivity of the liquid crystal switch is high, the liquid crystal switch looks bright. As described above, the liquid crystal switches are two-dimensionally disposed on the liquid crystal panel 21. Therefore, the voltage applied to each liquid crystal switch is adjusted, thereby displaying objects two-dimensionally. Further, the sidelights 10 and 11 emit white light or light pursuant to the white light, and a color filter is attached to each liquid crystal switch, thereby also displaying a color image. For ease of description, hereinafter, it is assumed that the liquid crystal switches exist over the entire face of the display unit 20 and an image with the same size as that of the display unit 20 can be displayed.

Figures 3, 4:
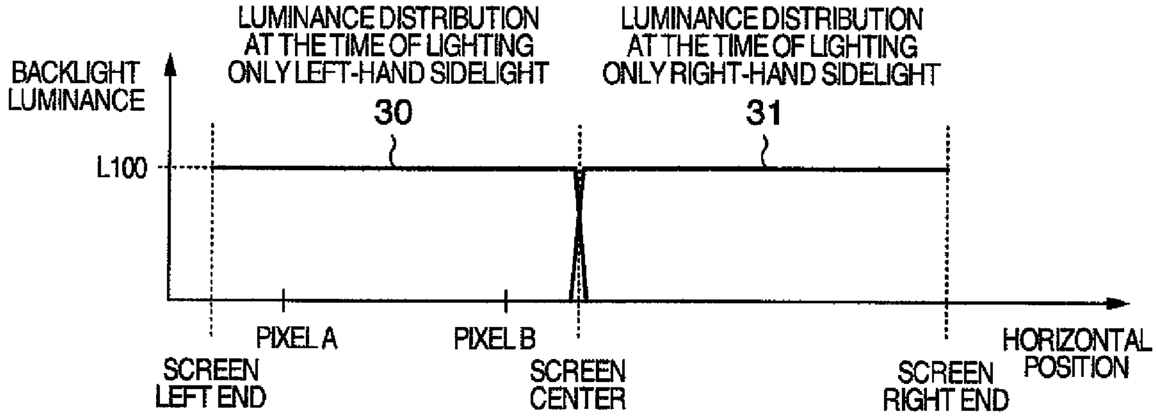
FIG. 3 is a view illustrating a relationship between a nearest light source and a corresponding area.
FIG. 4 is a cross-sectional view illustrating a luminance distribution in the case where interference between light sources is negligible.

At first, a method of performing the local dimming by the controller 2 will be described on the assumption of an ideal case where interference between light sources is negligible. In this case, as in FIG. 1, the entire display screen of the display unit 20 is divided into eight areas whose number is equal to the number of the light sources. An area to which each pixel belongs is determined based on a light source that is proximate to the pixel. The area to which each pixel belongs is not redundantly determined and all the pixels are determined so as to belong to an area. FIG. 3 illustrates an example of the area division in the case where a resolution of a maximum image capable of controlling the display on the display unit 20 is set tobe 1920 pixels wide and 1080 pixels long. Here, as for the pixel coordinates, an upper left of the display unit 20 is defined as an origin, namely, x=0 and y=0. As an ideal case, FIG. 4 illustrates the luminance distribution of the backlight at the time of cutting the display unit 20 by a plane vertical to the Y-axis. In the FIG. 4, the value L100 indicates the maximum of the backlight luminance at the time of lighting each light source in the light emission intensity of 100%.

In an example of this figure, the entire backlight luminance value becomes equal to the value L100 regardless of a position of the pixels. Light emitted from the left-hand sidelight 10 keeps uniform luminance from a left end of the screen to a center of the screen, and is rapidly attenuated in the center to zero (characteristics 30 of FIG. 4). On the contrary, light emitted from the right-hand sidelight 11 keeps uniform luminance from a right end of the screen to a center of the screen, and is rapidly attenuated in the center to zero (characteristics 31 of FIG. 4). In this case, it can be said that interference of light between areas in the horizontal direction is approximately equal to zero. In the same manner, in this ideal case, interference of light between areas in the vertical direction is also assumed to be approximately equal to zero. In this case, the backlight luminance in each of the areas (0, 0) to (1, 3) is uniquely determined only by the light emission luminance of the nearest light sources 100 to 113 indicated in FIG. 3.

When, for example, aiming at the area (0, 3), the backlight luminance of the pixels included in this area is uniquely determined by the light emission intensity of the light source 103 regardless of the position within the area. Specifically, when the light source 103 is lighted in the light emission intensity of 100%, the backlight luminance value of both the pixels A and B becomes equal to the value L100 regardless of states of the other light sources. When the light source 103 is lighted in the light emission intensity of C %, the backlight luminance value of both the pixels A and B becomes equal to L100×C.

As described above, when the backlight luminance is uniform regardless of the position within the area, an optimum luminous ratio $\alpha$ for the backlight can be calculated from a pixel value Pmax of the pixel with the maximum luminance within the area. The procedure will be described with reference to FIG. 5.

A general liquid crystal display apparatus is adjusted such that power characteristics called gamma characteristics hold between the input pixel value and the transmissivity of the liquid crystal switch. That is, the $\gamma$th power of the input pixel value becomes equal to the transmissivity of the liquid crystal switch. Here, the pixel value and the transmissivity of the liquid crystal switch are assumed to be normalized in the range of 0 to 1 using the respective maximums. Further, $\gamma$ is a constant value, and generally set to a value adjacent to 2.2.

In this case, the brightness V of the pixel visible to human eyes can be represented by the product of the $\gamma$th power of the normalized pixel value P and the backlight luminance BL. When the pixel value is represented in 8 bits, the maximum thereof is equal to 255. Therefore, the brightness V0(x, y) at the time when human beings view the pixel of the coordinates (x, y) before light control can be represented by an expression 1 using the pixel value P0(x, y) of the coordinates (x, y) before the light control and the BL0(x, y) before the light control. In the same manner, when respective values after the light control are set to V1(x, y), P1(x, y), and BL1(x, y), a relationship of an expression 2 holds among the values V1(x, y), P1(x, y), and BL1(x, y). Here, in order that the same image may be visible to human eyes before and after the light control, the V0(x, y) and the V1(x, y) may be equal to each other in all the coordinates (x, y). In this case, an expression 3 is derived from the expressions 1 and 2. In order that the expression 3 may hold in all the coordinates (x, y), this expression must hold also in the maximum Pmax of the P0(x, y) in each area. At this time, when the P1(x, y) is adjusted so as to be equal to 255 as the maximum capable of being represented in 8 bits, the maximum effect of reduction in the power consumption can be realized.

When the above-described values are substituted in the expression 3, an expression 4 holds. When the expression 4 is transformed, an expression 5 holds with regard to the luminous ratio $\alpha$ of the backlight. The expression 5 means that the brightness of the light source for the area to which the pixel (x, y) belongs can be multiplied by $\alpha$. Here, $\alpha$ is a value between 0 and 1. Since each light source is PWM-controlled, the brightness of the light source and the power consumption are roughly proportional to each other. In short, the light emission intensity of the light source for the area to which the pixel (x, y) belongs can be multiplied by α, and at this time, the power consumption is also multiplied by α.

In this connection, only when the brightness of the light source is simply multiplied by α, the brightness V1(x, y) at the time when human beings view the image is also multiplied by α, and as a result, the video is changed. To cope with the above-described problem, the dimmed light of the backlight is required to be canceled out by increasing the pixel value P1(x, y) after the light control. With regard to the value of the P1(x, y), the expression 3 is transformed to derive an expression 6. That is, the light source is controlled according to the expression 5, and at the same time, a value of the image side is also multiplied by a correction value according to the expression 6, thereby preventing the change in the video.

In addition, when there occurs a case where the P1(x, y) calculated by the expression 6 is greater than the maximum 255 that can be represented in 8 bits, the image cannot be correctly displayed. However, as long as the expression 5 holds, the above-described case does not occur.

The description is made above on a method of performing the local dimming in the ideal case where interference between the light sources is negligible.

Figure 6:
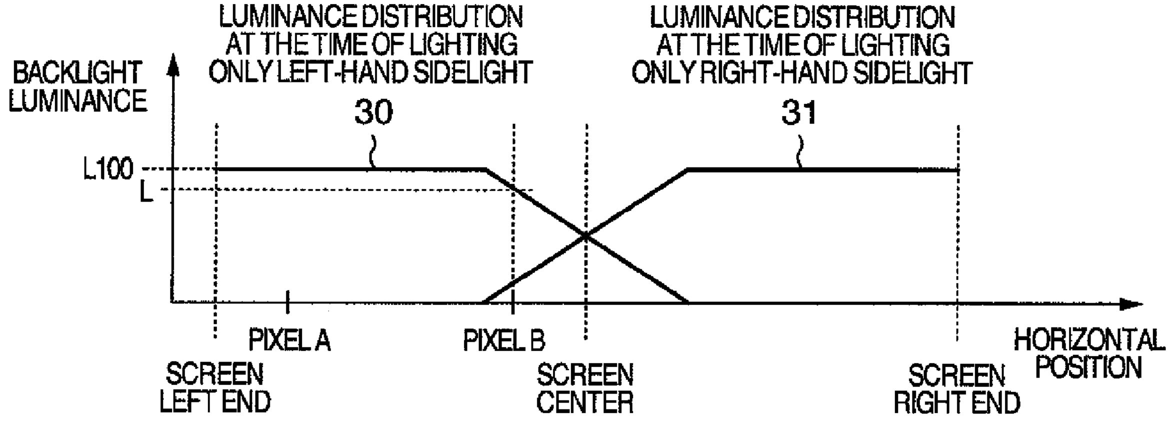
FIG. 6 is a cross-sectional view illustrating a luminance distribution in the case where interference between light sources is not negligible.

Actually, in some cases interference between the light sources is not negligible. A problem of that case will be described with reference to FIG. 6. Here, assumed is a case where interference between the light sources occurs only in the horizontal direction and interference between the light sources in the vertical direction is negligible. For example, when the pixel (x, y) within the area (0, 3) of FIG. 1 is processed, only the light sources 103 and 113 may be considered. In FIG. 6, the value L100 represents the maximum of the backlight luminance at the time of lighting each light source in the light emission intensity of 100%. Light emitted from the left-hand sidelight 10 keeps uniform luminance partway from the left end of the screen toward the center of the screen. However, light is gradually attenuated as approaching the center. Passing through the center of the screen, and after a brief interval, light is attenuated to zero (characteristics 30 of FIG. 6). On the contrary, light emitted from the right-hand sidelight 11 keeps uniform luminance partway from the right end of the screen toward the center of the screen. However, light is gradually attenuated as approaching the center. Passing through the center of the screen, and after a brief interval, light is attenuated to zero (characteristics 31 of FIG. 6).

Here, there is considered a case where the maximum Pmax of the pixel in the region (0, 3) is equal to 186 and the maximum Pmax of the pixel in the region (1, 3) is equal to 90. For ease of description, fractional figures after the decimal points are neglected in the following description.

Figure 7:
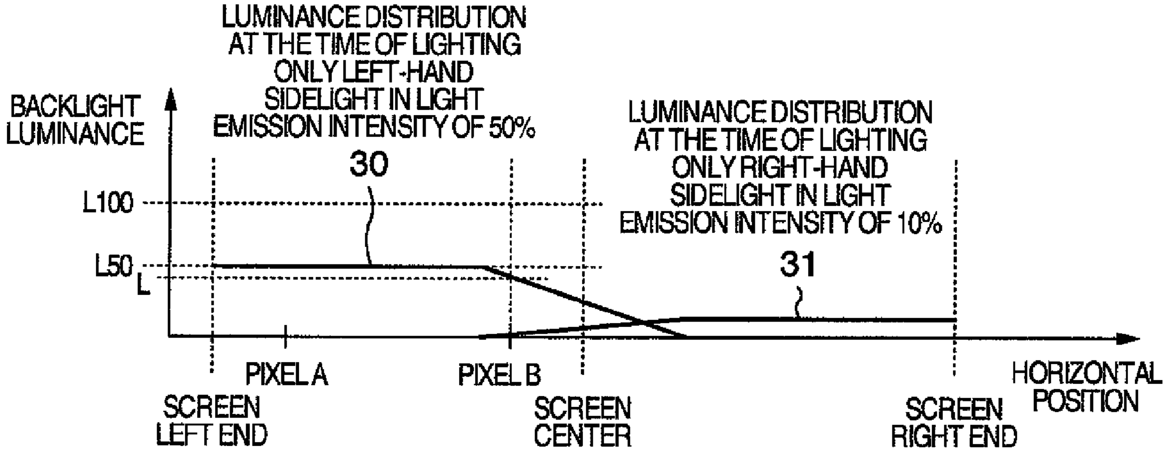
FIG. 7 is a cross-sectional view (at the time of dimming light) illustrating a luminance distribution in the case where interference between light sources is not negligible.

When interference between the light sources is not negligible, the central term of the expression 5 has different values depending on the coordinates. Therefore, an expression 7 of FIG. 10 having removed therein the central term of the expression 5 is used. When substituting the maximum Pmax in the expression 7, the luminous ratio α103 of the light source 103 is equal to about 50% and the luminous ratio α113 of the light source 113 is equal to about 10%. In other words, the light source 103 is lighted in the light emission intensity of 50%, and the light source 113 is lighted in the light emission intensity of 10%. In this case, the cross section of the backlight luminance distribution in the areas (0, 3) and (1, 3) has characteristics obtained by adding those 30 and 31 of FIG. 7.

When the pixel with the maximum Pmax=186 exists at a position of the pixel A, BL0(x, y)/BL1(x, y) is approximately equal to 2 in the expression 6, and as a result, the P1(x, y) is equal to about 255. Since 255 can be represented in 8 bits, this case can be displayed without problems.

On the other hand, when the pixel with the maximum Pmax=186 exists at a position of the pixel B, BL0(x, y)/BL1(x, y) is greater than 2 in the expression 6. In this case, the P1(x, y) has a value greater than the maximum 255 that can be represented in 8 bits, and the brightness of the pixel B cannot be displayed without errors. As a result, this causes deterioration in the image quality.

Figure 8:
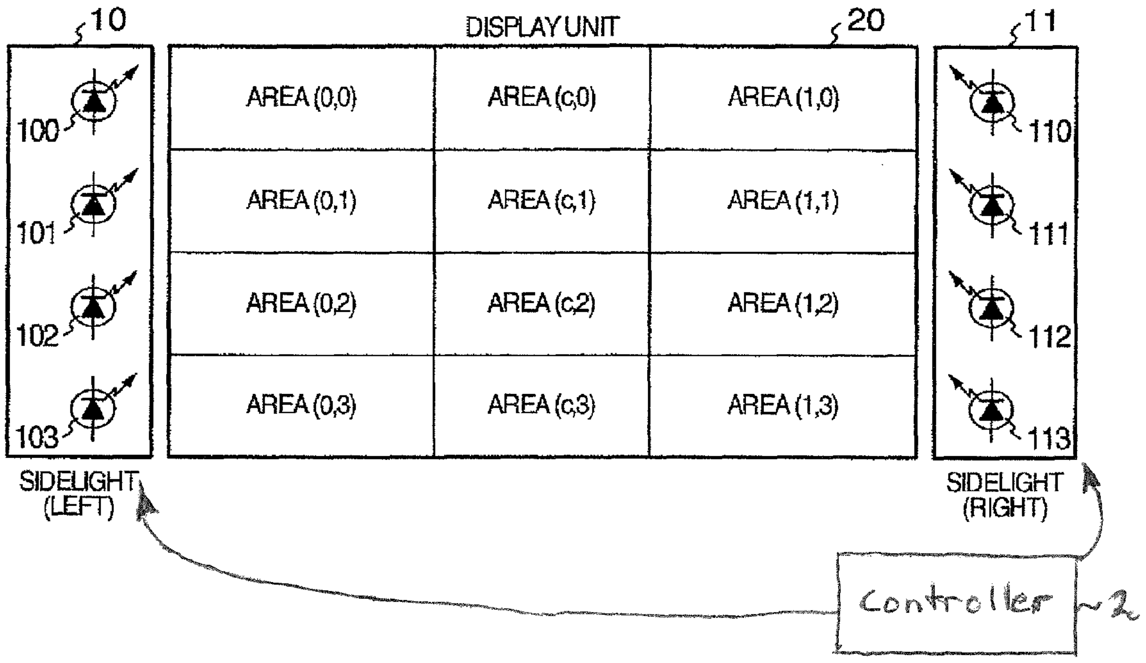
FIG. 8 is a view illustrating an area division corresponding to interference between light sources in the horizontal direction.

For the purpose of solving the above-described problem, in the present embodiment, adopted is a method of dividing the display screen into 12 areas whose number is greater than 8 being the number of the controllable light sources as in FIG. 8, and calculating in the controller 2 the maximum in each area. In the area division in the longitudinal direction, the display screen is divided into four areas (x, 0), (x, 1), (x, 2), and (x, 3) as in FIG. 3 while corresponding to the nearest light source as heretofore described. Here, x indicates a position in the lateral direction, that is, any one of 0, 1, and c.

Figure 9:
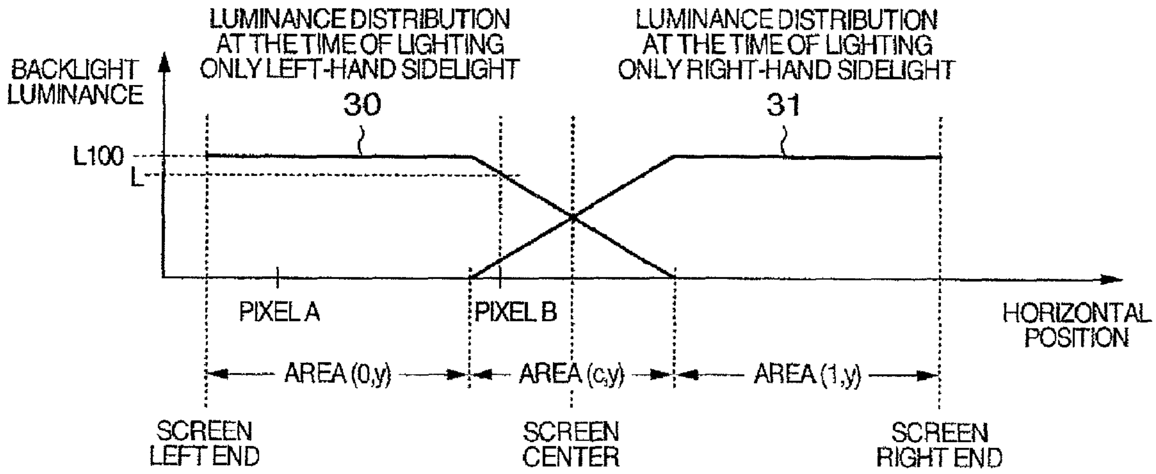
FIG. 9 is a cross-sectional view illustrating a luminance distribution in which an area division is added.

The division method in the lateral direction is performed as in FIG. 9. Specifically, an area on which light emitted from the left-hand light source is dominantly irradiated is defined as an area (0, y), an area on which light emitted from the right-hand light source is dominantly irradiated is defined as an area (1, y), and an area on which light emitted from both of the left-hand light source and the right-hand light source is mixedly irradiated is defined as an area (c, y). Here, y is a number of 0 to 3 indicating a position in the longitudinal direction. The division position of these areas is not strict, and can be flexibly determined such as even if affected in some degree by light emitted from the right-hand light source, an area is allocated to the area (0, y).

Here, a description will be made while aiming at the bottom areas (0, 3), (c, 3), and (1, 3) of the screen and the light sources 103 and 113 that have an effect on these areas in the same manner as in the previous description. For ease of description, it is assumed that an effect that is exerted on these areas by all the light sources except the light sources 103 and 113 is negligible. In this case, the light emission intensities of the light sources 103 and 113 are determined by the controller 2 as follows.

(1) Search the area (0, 3) for a point with the highest luminance. Define this luminance value as P03.

(2) Search the area (1, 3) for a point with the highest luminance. Define this luminance value as P13.

(3) Search the area (c, 3) for a point with the highest luminance. Define this luminance value as Pc3. Further, define the coordinates of the pixel with the highest luminance as (mx, my).

(4) Using the expression 7 after substituting a value of the P03 for the Pmax, calculate the luminous ratio α103 of the light source 103.

(5) Using the expression 7 after substituting a value of the P13 for the Pmax, calculate the luminous ratio α113 of the light source 113.

(6) Find the luminance Pc3*e* of the coordinates (mx, my) at the time when the light source 103 is lighted with the luminous ratio α103, and the light source 113 is lighted with the luminous ratio α113.

(7) Here, when the light source 103 is lighted with the luminous ratio α103, and the light source 113 is lighted with the luminous ratio α113, the backlight of the coordinates (mx, my) emits light with the luminance that is (Pc3/Pc3*e*) times the required luminance.

(8) If the inequality Pc3*e*≥Pc3 holds, the backlight has the luminance sufficient to display a point with the highest luminance in the area (c, 3). In this case, use the luminous ratios α103 and α113 as those of the light sources 103 and 113.

(9) If the inequality Pc3e<Pc3 holds, the backlight has not the luminance sufficient to display a point with the highest luminance in the area (c, 3). In this case, use values obtained by multiplying the luminous ratios α103 and α113 by (Pc3/Pc3e), respectively, as those of the light sources 103 and 113.

When the luminous ratios of the light sources 103 and 113 are determined using the above-described procedure, the luminous ratio in which deterioration in the video is more reduced can be selected. In addition, when the luminous ratio of one light source exceeds 100% by multiplying the luminous ratios α103 and α113 by (Pc3/Pc3e) in the item (9), the luminous ratio of the light source is set to 100%. When the luminous ratio of the other light source is raised up to Pc3e=Pc3, the control can be more appropriately performed.

When the above-described procedure is applied to all the light sources, the luminous ratios of all the light sources are determined. Further, a value of BL0(x, y)/BL1(x, y), which is necessary for the correction of the pixel values in all the coordinates (x, y) within the screen, is uniquely determined. Then,the controller 2 controls each light source according to the luminous ratio, and at the same time, corrects all of the pixel values using the expression 6, thereby reducing the power consumption.

Figures 10, 11:
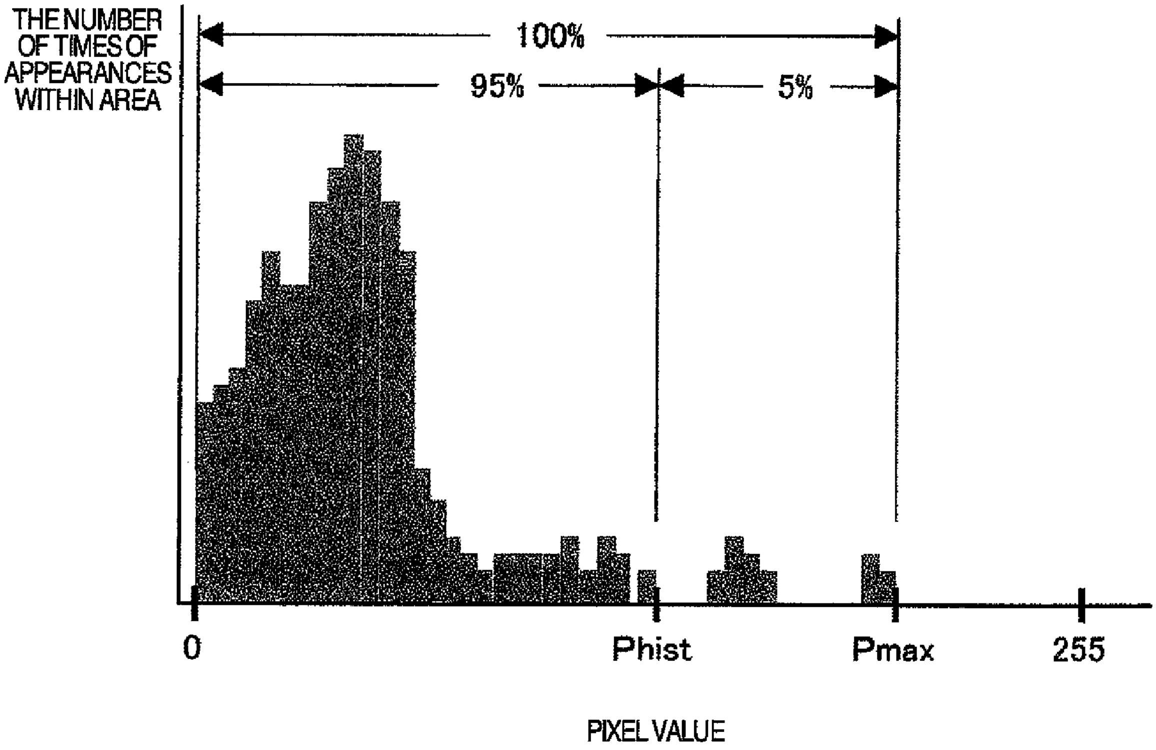
FIG. 10 is a view illustrating a calculating expression in the case where interference between light sources is not negligible.
FIG. 11 is a histogram illustrating a pixel value of each area.

In addition, in this example, the maximum in each area is used to determine the luminous ratio of each light source. This method has an advantage that deterioration in the image quality is small; however, the amount of reduction in the power consumption tends to be suppressed. In order to solve the above-described problem, it is effective to use the histogram to determine the luminous ratio of each light source. This method will be described with reference to FIG. 11. In FIG. 11, all the pixels within one area are targeted and the histogram is created using the horizontal axis as the pixel value and the vertical axis as the number of times of appearances. A point positioned on the rightmost side in the histogram represents the maximum pixel within this area, and its value is the Pmax. This Pmax is substituted in the expression 7, and thereby, the luminous ratio α of the light source corresponding to the Pmax is found. As understood when viewing the expression 7, as the Pmax is smaller, the luminous ratio α of the light source can be more reduced, and accordingly, the power consumption reduction effect is more improved. When the Pmax is thus determined, the deterioration in the image quality can be suppressed to zero in the ideal case.

On the other hand, human eyes tend to get dull with deterioration in the image quality. A method of using the histogram improves the power consumption reduction effect by using the above-described fact. Here, as an example, the maximum pixel is found for the remaining pixels obtained by excluding the pixels having included therein the luminance value in the top 5% from all the pixels within the area. The maximum pixel value corresponds to Phist of FIG. 11, and is largely reduced as compared with the Pmax. When this value is substituted for the Pmax of the expression 7, the power consumption reduction effect can be improved. In this connection, in this case, the pixels removed in the top 5% cannot reproduce a correct value after the image correction, and therefore, the image quality is deteriorated. Here, when a ratio (5% in this example) of the pixels to be removed is adjusted, the tradeoff between the deterioration in the image quality and the power-saving effect can be controlled.

A method of determining the light emission intensities of the light sources 103 and 113 in the case of applying this method of using the histogram to the area division of FIG. 8 is performed as follows.

(1) Search the area (0, 3) for a pixel with the highest luminance among the remaining pixels obtained by excluding the pixels having included therein the luminance value in the top 5% therefrom. Define this luminance value as P03.

(2) Search the area (1, 3) for a pixel with the highest luminance among the remaining pixels obtained by excluding the pixels having included therein the luminance value in the top 5% therefrom. Define this luminance value as P13.

(3) Search the area (c, 3) for a pixel with the highest luminance among the remaining pixels obtained by excluding the pixels having included therein the luminance value in the top 5% therefrom. Define this luminance value as Pc3.

(4) Using the expression 7 obtained by substituting a value of the P03 for the Pmax, calculate the luminous ratio α103 of the light source 103.

(5) Using the expression 7 obtained by substituting a value of the P13 for the Pmax, calculate the luminous ratio α113 of the light source 113.

(6) Find the average luminance in the area (c, 3) at the time when the light source 103 is lighted with the luminous ratio α103 and the light source 113 is lighted with the luminous ratio α 113, and further, define this obtained value as the Pc3e.

(7) If the inequality Pc3e≥Pc3 holds, use the luminous ratios α103 and α113 as those of the light sources 103 and 113.

(8) If the inequality Pc3e<Pc3 holds, use values obtained by multiplying the luminous ratios α103 and α113 by (Pc3/Pc3e), respectively, as those of the light sources 103 and 113.

In addition, in the item (6) of this example, the average luminance in the area (c, 3) is defined as the Pc3e; further, a value obtained by multiplying the average luminance in the area (c, 3) by N may be defined as the Pc3e by giving a margin for the Pc3e. N is an arbitrary number. When this value is reduced, the power consumption reduction effect is lowered; however, deterioration in the image quality can be more suppressed. On the contrary, when N is increased, the power consumption reduction effect is improved; however, deterioration in the image quality increases. When N is thus adjusted, the output characteristics can be more approximated to desired characteristics.

A relationship between the display image and the sidelight behaves differently in the past by adopting the above-described constitution. Suppose a case where the entire display screen is painted in a light gray color and a luminescent spot like a star is located only at a position of the pixel A in FIG. 1. In such a case, when adopting a method of determining light source luminance based on the luminance value of a point with the maximum luminance within the area, this luminescent spot is included in the area (0, 3) in both of FIGS. 1 and 8. That is, even if the area division is performed using any segment of FIGS. 1 and 8, the left-hand light source 103 lights brightly and the remaining light sources light slightly to reproduce a light gray color in the above-described case.

On the other hand, suppose a case where the entire display screen is painted in a light gray color and a luminescent spot like a star is located only at a position of the pixel B in FIG. 1. In such a case, when adopting a method of determining light source luminance based on the luminance value of a point with the maximum luminance within the area, this luminescent spot belongs to the area (0, 3) in FIG. 1, and belongs to the area (c, 3) in FIG. 8. That is, when the area division is performed using the segment of FIG. 1, the left-hand light source 103 lights brightly and the remaining light sources light slightly to reproduce a light gray color. Meanwhile, when the area division is performed using the segment of FIG. 8, the left-hand light source 103 lights brightly, and at the same time, the right-hand light source 113 also lights more brightly than the remaining light sources.

As described above, when using the method according to the present invention, the light emission luminance of each light source may be changed even if an object moves within one area of FIG. 1. In the example of this sidelight, even if an object moves within one area on the left half of the screen, the light emission luminance of the light source on the right half of the screen may be changed.

(Embodiment 2)

The embodiment 1 assumes a case where interference between the light sources occurs only in the horizontal direction and interference between the light sources in the vertical direction is negligible; however, the embodiment 1 may assume a case where interference between the light sources occurs only in the vertical direction and interference between the light sources in the horizontal direction is negligible depending on characteristics in an optical system. In the above-described case, another area is provided in the vicinity of a border between areas (x, y) and (x, y+1), thereby suppressing deterioration in the image quality. This method will be described with reference to FIG. 12.

Figure 12:
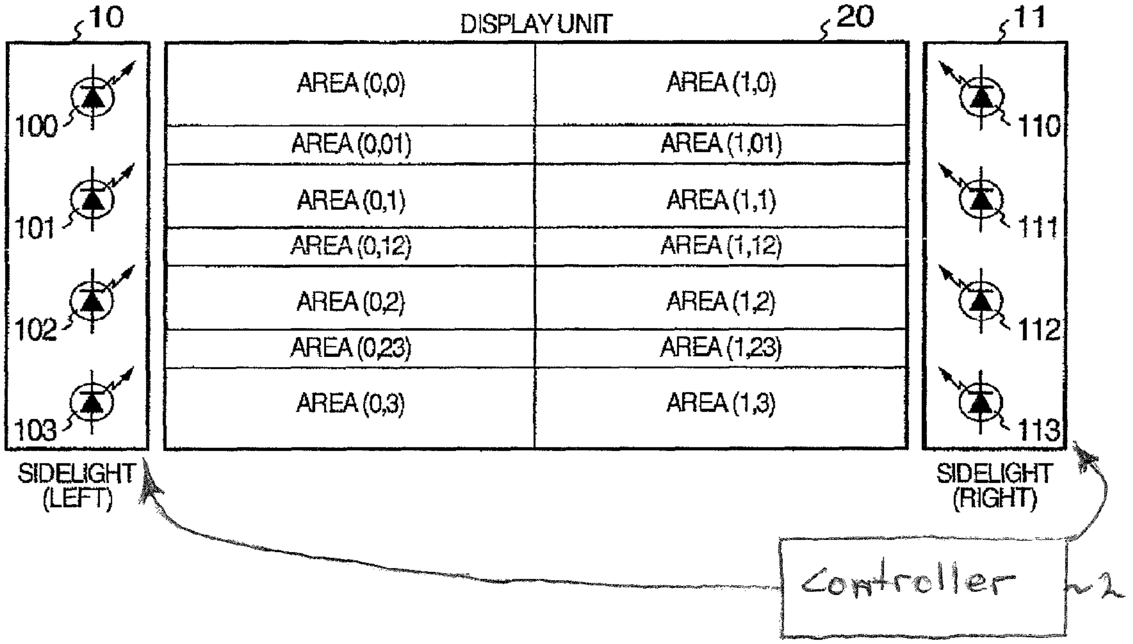
FIG. 12 is a view illustrating an area division corresponding to interference between light sources in the vertical direction.

When no interference between the light sources occurs as in FIG. 1, light for irradiating the area (0, 0) is supplied from the light source 100, and light for irradiating the area (0, 1) is supplied from the light source 101. However, when interference between the light sources occurs in the vertical direction, an area that is irradiated by light supplied from both of the light sources 100 and 101 is formed in the vicinity of a border between the areas (0, 0) and (0, 1). In FIG. 12, this area is defined as an area (0, 01). In this embodiment 2, the original areas are adjusted such that the respective areas are exclusively formed. For example, a remaining area obtained by excluding an area equivalent to the area (0, 01) in FIG. 12 from the area (0, 0) in FIG. 1 corresponds to the area (0, 0) according to the present embodiment.

An example of a method of determining the light emission intensity of each light source in this constitution will be described. Here, a method of determining the light emission intensity of each light source will be described based on the maximum within the area; however, the determination method is not limited thereto. Various methods such as a method of using the histogram described in the embodiment 1 are considered.

First, the luminous ratios of the light sources 100 and 101 are here determined using the following procedure.

(a1) Search the area (0, 0) for a point with the highest luminance. Define this luminance value as P00.

(a2) Search the area (0, 1) for a point with the highest luminance. Define this luminance value as P01.

(a3) Search the area (0, 01) for a point with the highest luminance. Define this luminance value as P001. Further, define the coordinates of the pixel with the highest luminance as (mx, my).

(a4) Using the expression 7 after substituting a value of the P00 for the Pmax, calculate the luminous ratio α100 of the light source 100.

(a5) Using the expression 7 after substituting a value of the P01 for the Pmax, calculate the luminous ratio α101 of the light source 101.

(a6) Find the luminance P001*e* of the coordinates (mx, my) at the time when the light source 100 is lighted with the luminous ratio α100, and the light source 101 is lighted with the luminous ratio α101.

(a7) If the inequality P001*e*≥P001 holds, the backlight has the luminance sufficient to display a point with the highest luminance in the area (0, 01). In this case, use the luminous ratios α100 and α101 as those of the light sources 100 and 101 without change.

(a8) If the inequality P001*e*<P001 holds, the backlight has not the luminance sufficient to display a point with the highest luminance in the area (0, 01). In this case, use values obtained by multiplying the luminous ratios α100 and α101 by (P001/P001*e*), respectively, as those of the light sources 100 and 101.

In the same manner, the luminous ratios of the light sources 101 and 102 are determined using the following procedure.

(b1) Search the area (0, 1) for a point with the highest luminance. Define this luminance value as P01.

(b2) Search the area (0, 2) for a point with the highest luminance. Define this luminance value as P02.

(b3) Search the area (0, 12) for a point with the highest luminance. Define this luminance value as P012. Further, define as (mx, my) the coordinates of the pixel with the highest luminance.

(b4) Using the expression 7 after substituting a value of the P01 for the Pmax, calculate the luminous ratio α101 of the light source 101.

(b5) Using the expression 7 after substituting a value of the P02 for the Pmax, calculate the luminous ratio α102 of the light source 102.

(b6) Find the luminance P012*e* of the coordinates (mx, my) at the time when the light source 101 is lighted with the luminous ratio α101, and the light source 102 is lighted with the luminous ratio α102.

(b7) If the inequality P012*e*≥P012 holds, the backlight has the luminance sufficient to display a point with the highest luminance in the area (0, 12). In this case, use the luminous ratios α101 and α102 as those of the light sources 101 and 102 without change.

(b8) If the inequality P012*e*<P012 holds, the backlight has not the luminance sufficient to display a point with the highest luminance in the area (0, 12).

In this case, use values obtained by multiplying the luminous ratios α101 and α102 by (P012/P012*e*), respectively, as those of the light sources 101 and 102.

When the luminous ratio of each light source is sequentially determined as described above, the light source in which a plurality of luminous ratios are calculated exists in some cases. In this example, the luminous ratio α101 of the light source 101 is calculated through both of the flow (a1) to (a8) and the flow (b1) to (b8). In the above-described case, among the luminous ratios calculated through the respective flows, the maximum luminous ratio is defined as that of the light source.

The luminous ratios of all the light sources are determined by repeating the above-described procedure. When the luminous ratios of all the light sources are determined, the luminance distribution of the backlight is uniquely determined. Each light source is controlled according to the calculated luminous ratio, and at the same time, correction of the image is performed by the expression 6 based on the luminance distribution of the backlight. Thereby, the power consumption can be reduced in a state that deterioration in the image quality is more suppressed.

(Embodiment 3)

Figure 13:
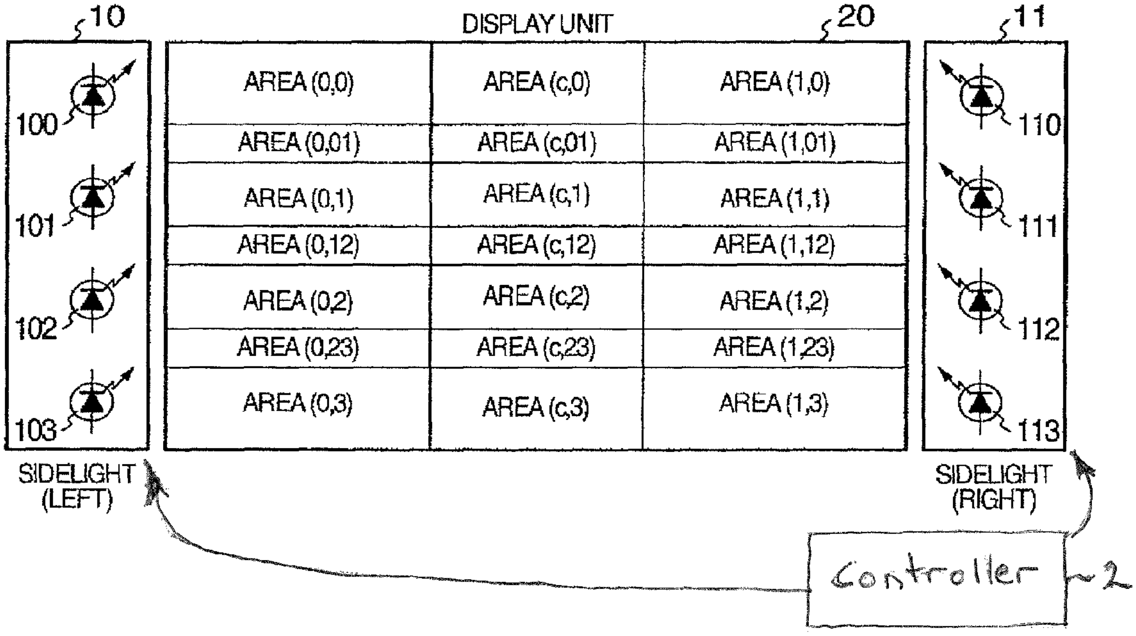
FIG. 13 is a view illustrating an area division corresponding to interference between light sources in the horizontal direction and in the vertical direction.

In the embodiments 1 and 2, a description is made on a case where interference between the light sources occurs in any one of the horizontal direction and the vertical direction and interference between the light sources in the other direction is negligible; further, even if interference between the light sources in both the directions is not negligible, the present invention is effective. The above-described case will be described with reference to FIG. 13.

In this embodiment, in the same manner as in the embodiment 1, an area with which light emitted from the light sources for irradiating both the areas interferes in the vicinity of a border between the areas (x, y) and (x+1, y) is defined as an area (c, y) again, thereby corresponding to interference between the light sources in the horizontal direction. Further, in the same manner as in the embodiment 2, an area with which light emitted from the light sources for irradiating both the areas interferes in the vicinity of a border between the areas (x, y) and (x, y+1) is defined as another area again, thereby corresponding to interference between the light sources in the vertical direction.

A calculation example of light emission intensity of each light source according to the present embodiment is given as follows.

(1) Determine the luminous ratio α100 of the light source 100 using pixel information on the area (0, 0). The image information is information such as the maximum luminance value and histogram within areas.

(2) Determine the luminous ratio α110 of the light source 110 using pixel information on the area (1, 0).

(3) Determine the luminous ratio α101 of the light source 101 using pixel information on the area (0, 1).

(4) Determine the luminous ratio α111 of the light source 111 using pixel information on the area (1, 1).

(5) Calculate a value obtained by adjusting a value of the luminous ratio α100 of the light source 100 and that of the luminous ratio α110 of the light source 110 using pixel information on the area (c, 0) according to the same procedure as that of the embodiment 1.

(6) Calculate a value obtained by applying the same method as that of the item (5) also to the areas (c, 1), (0, 01), and (1, 01) and adjusting the luminous ratio of each light source.

(7) Search the area (c, 01) for a point with the highest luminance. Define this luminance value as Pc01. Further, define the coordinates of this pixel with the highest luminance as (mx, my).

(8) Find luminance Pc01*e* of the coordinates (mx, my) at the time of lighting the light sources 100, 110, 101, and 111 with the luminous ratios calculated by the items (1) to (4).

(9) If the inequality Pc01*e*≥Pc01 holds, use the luminous ratios of the light sources 100, 110, 101, and 111 without change.

(10) If the inequality Pc01*e*<Pc01 holds, use values obtained by multiplying the luminous ratios of the light sources 100, 110, 101, and 111 by (Pc01/Pc01*e*), respectively, as that of each light source.

Here, the above-described method is performed while aiming at only an upper half of the screen, and further, the method is performed for the entire screen. When a plurality of luminous ratios are calculated with regard to one light source using the above-described procedure, the maximum luminous ratio among those is used as that of the light source.

In addition, in the previous embodiments, a description is made with reference to the so-called sidelight type display device in which each light source is disposed on both sides of the display unit; further, the same processing can be performed also in the display device using a so-called direct backlight type in which each light source is disposed under the display unit. That is, the present invention is effective without depending on the sidelight type or the direct type.

(Embodiment 4)

Figure 14:
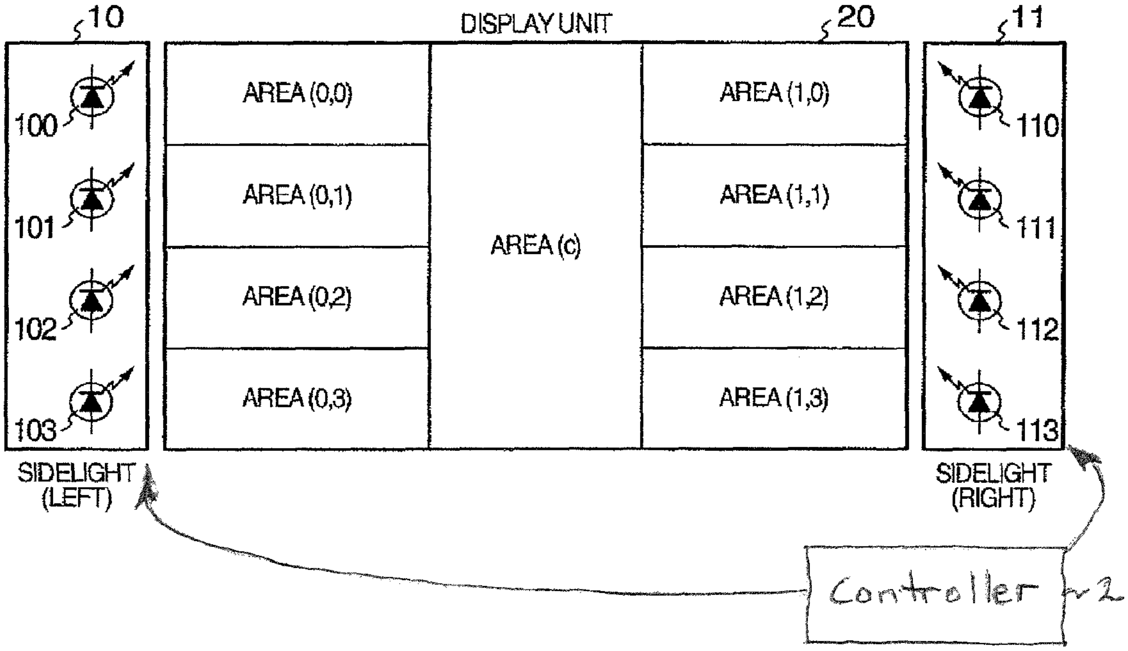
FIG. 14 is a view illustrating an area division at the time when light in the vicinity of the center is uniformly mixed.

In FIG. 8 of the embodiment 1, a central area of the display unit 20 is composed of four areas, namely, the areas (c, 0) to (c, 3). However, depending on characteristics of the optical system, light emitted from each light source may be approximately uniformly mixed in the vicinity of the center of the display unit 20. In the above-described case, the central area of the display unit 20 is not divided into the areas (c, 0) to (c, 3), but may be effectively treated as an area (c) collectively as in FIG. 14. In FIG. 14, eight areas of the areas (0, 0) to (1, 3) and the area (c) are assumed to be not overlapped with each other.

In this case, the luminous ratio of each light source is determined using the following procedure.

(1) Determine the luminous ratio α100 of the light source 100 using pixel information on the area (0, 0). Perform the same processing to each light source, and determine the luminous ratio of each light source.

(2) Search the area (c) for a point with the highest luminance. Define this luminance value as Pc. Further, define the coordinates of this pixel with the highest luminance as (mx, my).

(3) Find luminance Pce of the coordinate (mx, my) at the time of lighting each light source with the luminous ratio calculated by the item (1).

(4) If the inequality Pce≥Pc holds, use the luminous ratio of each light source without change.

(5) If the inequality Pce<Pc holds, use values obtained by multiplying the luminous ratio of each light source by (Pc/Pce), respectively, as that of each light source.

Figure 15:
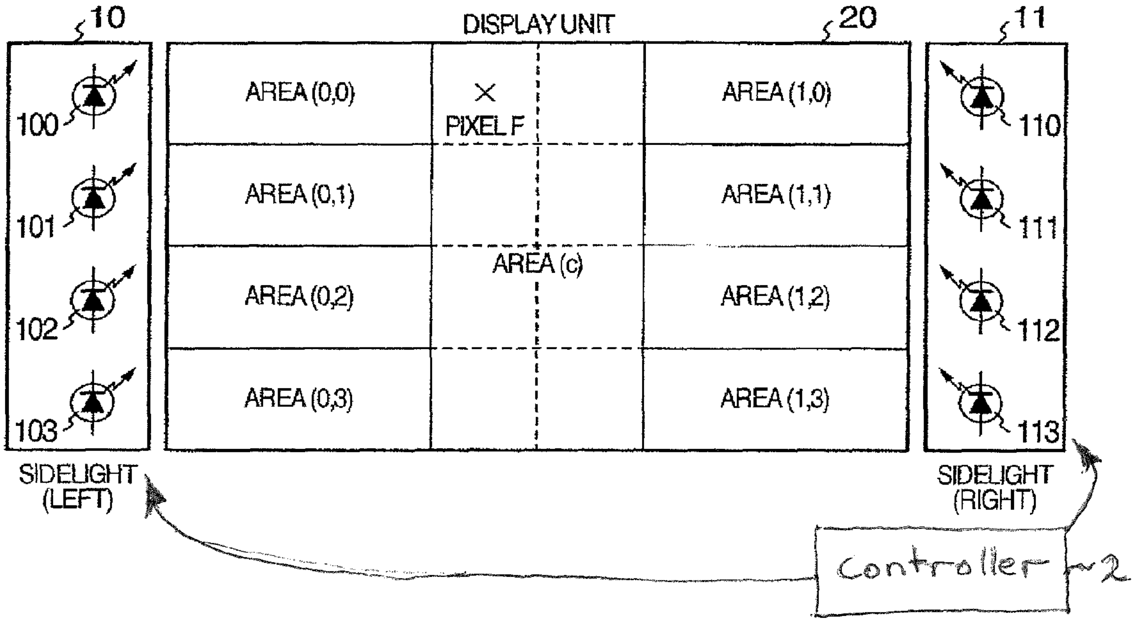
FIG. 15 is a view illustrating an area division at the time when light in the vicinity of the center is uniformly mixed.

In the above-described example, each area is assumed to be not overlapped with each other; however, depending on characteristics of the optical system, the areas may be overlapped with each other as in FIG. 15. In this diagram, a pixel F is included in both of the areas (0, 0) and (c). When light for irradiating each point within the area (c) is not uniformly mixed from each light source but slightly strongly affected by the nearest light source 100, the areas are thus overlapped with each other, and thereby, the control closer to an ideal value can be performed.

(Embodiment 5)

Another method of solving a problem caused by interference between the light sources will be described with reference to FIGS. 9 and 16 to 19. For ease of description, in the same manner as in the embodiment 1, the description will be here made assuming that interference between the light sources occurs only in the horizontal direction and interference between the light sources in the vertical direction is negligible. However, the present invention is not limited to this condition.

FIG. 9 illustrates a luminance distribution of the backlight in the display device that is adjusted such that the luminance distribution of the entire screen is approximated to flat characteristics at the time of lighting both of the right and left sidelights 10 and 11 in the light emission intensity of 100%, in short, at the time of lighting all the light sources. In this diagram, the value L100 represents the target luminance value of the backlight.

An area close to the left end of the screen is hardly affected by the right-hand sidelight 11, and therefore, the luminance value at the time of lighting only the left-hand sidelight in the light emission intensity of 100% approximately coincides with the value L100. Much the same is true on the area close to the right end of the screen.

On the other hand, in the vicinity of the center of the screen, for setting the luminance value at the time when both of the right and left sidelights is lighted in the light emission intensity of 100% to the value L100, the luminance value at the time when only any one of the right and left sidelights is lighted is required to be a value smaller than the value L100.

For this reason, when performing the local dimming in which the area is divided as in FIG. 1 and the light emission intensity of each light source is determined based on the maximum luminance of each area, the luminance in the backlight does not reach the required brightness, in some cases, in the vicinity of the center of the screen.

Figure 16:
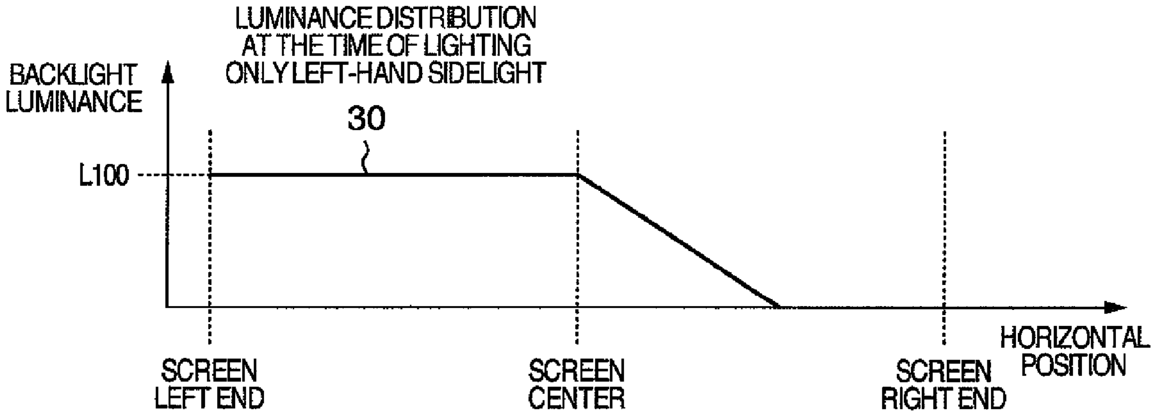
FIG. 16 is a view illustrating a luminance distribution due to a left-hand sidelight according to an embodiment 5 of the present invention.
Figure 17:
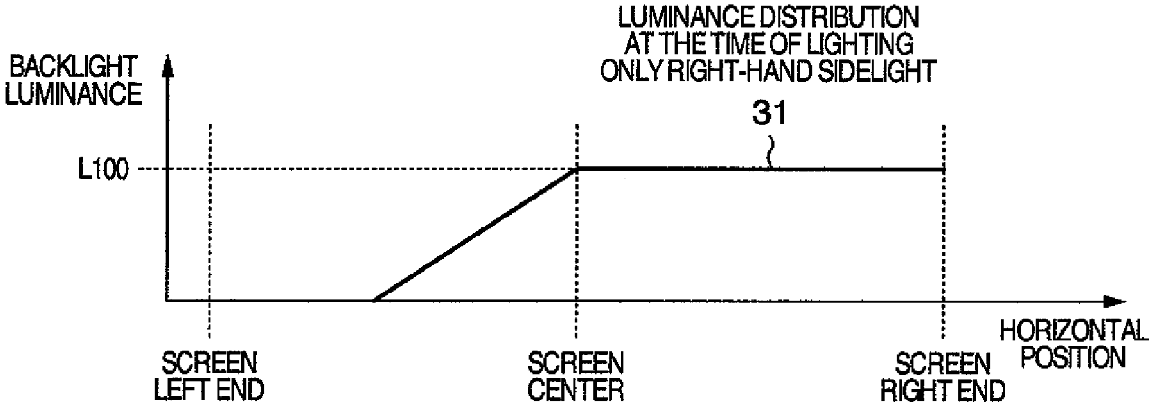
FIG. 17 is a view illustrating a luminance distribution due to a right-hand sidelight according to the embodiment 5 of the present invention.

To cope with the above-described problem, in the present embodiment, as in FIG. 16, even if the left-hand sidelight is lighted in the light emission intensity of 100% and the right-hand sidelight is lighted in the light emission intensity of 0%, the luminance distribution is set so that the target luminance value L100 can be maintained in the left-half screen. A reference number 30 in FIG. 16 denotes one example of the luminance distribution at this time. When a size and density of a reflection pattern formed on a surface of the light guide plate 23 are changed, the luminance distribution can be set. In the same manner, as in FIG. 17, even if the right-hand sidelight is lighted in the light emission intensity of 100% and the left-hand sidelight is lighted in the light emission intensity of 0%, the luminance distribution is set so that the target luminance value L100 can be maintained in the right-half screen. A reference number 31 in FIG. 17 denotes one example of the luminance distribution at this time.

Figure 18:
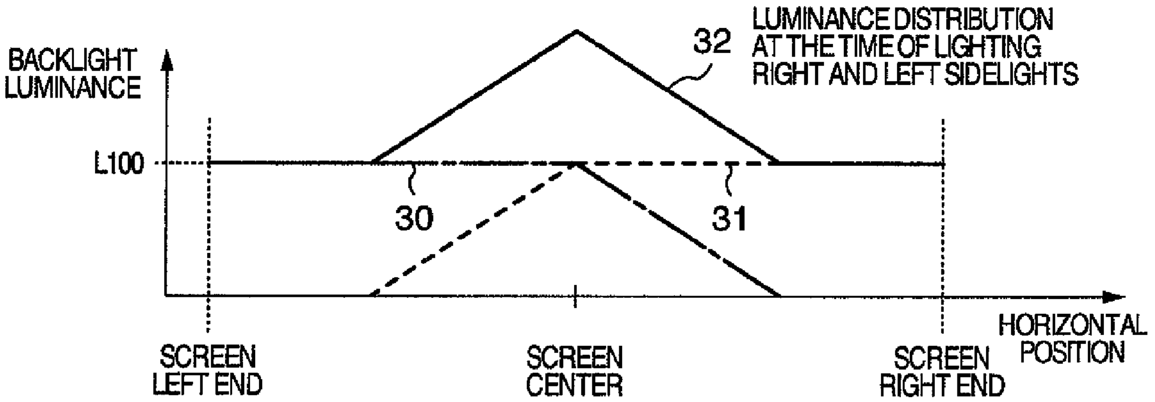
FIG. 18 is a view illustrating a luminance distribution due to both the sidelights according to the embodiment 5 of the present invention.

In this case, when both of the right and left sidelights are lighted in the light emission intensity of 100%, the luminance distribution in which an emphasis is put on the luminance in the vicinity of the center of the screen is obtained as denoted in a reference number 32 in FIG. 18. This luminance distribution corresponds to the BL0(x, y) of each expression in FIG. 5. Here, defined is a target backlight luminance distribution BLT(x, y) at the image correction. The luminance distribution BLT(x, y) has flat luminance distribution characteristics as denoted in a reference number 33 in FIG. 19.

Figures 19, 20:
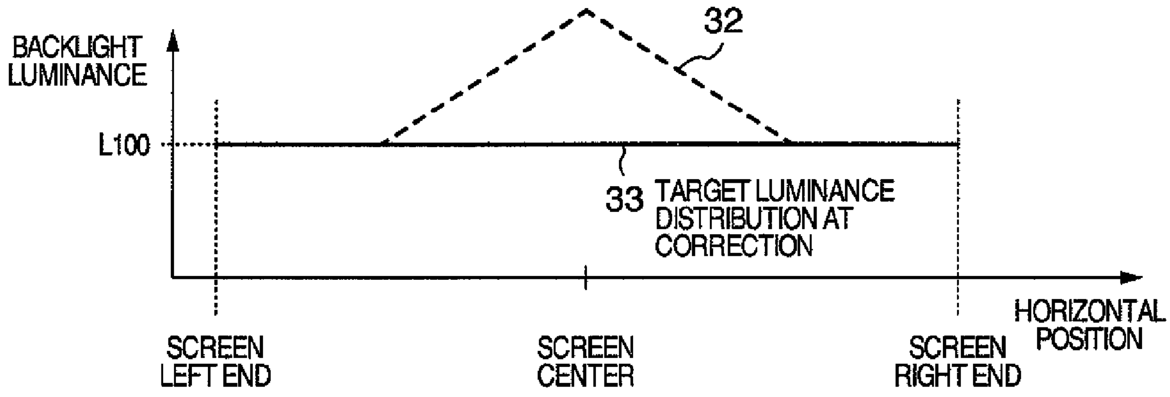
FIG. 19 is a view illustrating a target luminance distribution according to the embodiment 5 of the present invention.
FIG. 20 is a view illustrating calculating expressions for correcting an image according to the embodiment 5 of the present invention.

When the BLT(x, y) is substituted for the BL0(x, y) of the expression 6 in FIG. 5, an expression 8 of FIG. 20 is obtained. The luminous ratio α of the light source is calculated based on the expression 7 of FIG. 10 and the light emission luminance of each light source is controlled based on the luminous ratio α. Further, an expression 9 holds in all the pixels, and the P1(x, y) of the expression 8 can be set so as not to exceed 255. As a result, the deterioration in the image quality can be suppressed.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An image display apparatus, comprising:

a liquid crystal panel including a plurality of pixels disposed in a matrix, wherein transmittivity of the pixels is controlled based on an input image data, and wherein the liquid crystal panel includes at least:

a first image area on a first end side, a second image area on a second end side opposite to the first end side, and a third image area disposed between the first image area and the second image area;

a back light, having a plurality of light sources disposed on the back side of the liquid crystal panel, and configured to irradiate light from the plurality of light sources to the liquid crystal panel, wherein the liquid crystal panel is configured to display an image by changing a luminance through each pixel of the liquid crystal panel, according to a pixel value of the input image data, the luminance originating from the back light, and wherein the plurality of light sources include at least:

a first light source disposed on the first end side of the liquid crystal panel, and a second light source disposed on the second end side of the liquid crystal panel opposite to the first end side; and a controller configured to control the luminance of the first and second light sources, including to:

(a) obtain a first luminance value from pixel values of the input image data provided to the first image area, obtain a second luminance value from pixel values of the input image data provided to the second image area, and obtain a third luminance value from pixel values of the input image data provided to the third image area, and (b) independently control the luminance of the first and second light sources, based on the first luminance value provided to the first image area, the second luminance value provided to the second image area, and the third luminance value provided to the third image area, thereby independently controlling the luminance provided by each of the first and second light sources to the first image area, the second image area, and the third image area, wherein the first and second image areas are capable of displaying different luminances.

2. The image display apparatus according to claim 1, wherein the luminance value of an image area is obtained from pixels remaining after excluding, from the image area, pixels with a luminance value within a top predetermined percentage.

3. The image display apparatus of claim 1, the plurality of light sources of the back light further comprising: a third light source adjacent to the first light source in a perpendicular direction;

the liquid crystal panel further comprising: a fourth image area lined up in a perpendicular direction according to the first image area and corresponding to the third light source, and a fifth image area disposed between the first image area and fourth image area; and the controller further configured to:

control a light luminance value provided to the first image area, the fourth image area, and the fifth image area, by obtaining each luminance value of the image area from pixel values of the respective input image data of the first image area, the fourth image area, and the fifth image area, and individually control intensities of light of the first light source and the third light source, based on the obtained luminance value of each of the first image area, the second image area, and the third image area.

4. The image display apparatus of claim 1, the controller further configured to:

calculate a first luminance ratio based on the obtained luminance value of the first image area, and a second luminance ratio based on the obtained luminance value of the second image area;

calculate a luminance at the point of the luminance value in the third image area, when the first light source light is at the first luminous ratio and the second light source light is at the second luminous ratio;

compare the luminance value of the third image area and the calculated luminance in the third image area;

use the first luminous ratio and the second luminous ratio as luminous ratios of the first light source and the second light source, when the calculated luminance in the third image area is greater than the luminance value of the third image area; and use values obtained by multiplying the first luminous ratio and the second luminous ratio by a ratio of the luminance value of the third image area, and the calculated luminance in the third image area, as luminous ratios of the first light source and the second light source when the calculated luminance is less than the luminance value of the third image area.

* * * * *